A. P. SPROUL.

Saws.

No. 133,810. Patented Dec. 10, 1872.

UNITED STATES PATENT OFFICE.

ALFRED P. SPROUL, OF CHERRYFIELD, MAINE, ASSIGNOR TO HIMSELF AND GEORGE H. COFFIN, OF SAME PLACE.

IMPROVEMENT IN SAWS.

Specification forming part of Letters Patent No. 133,810, dated December 10, 1872.

*To all whom it may concern:*

Be it known that I, ALFRED P. SPROUL, of Cherryfield, in the county of Washington and State of Maine, have invented a new and useful Improvement in Saws, of which the following is a specification:

My invention consists in a transverse slot at each end of the saw for the bolt, by which the "strap," bar, or other device is connected for attaching the saw to the gate so that the saw can be readily shifted forward or back on the said connections to alter the strain or overhang of the saw.

Figure 1:
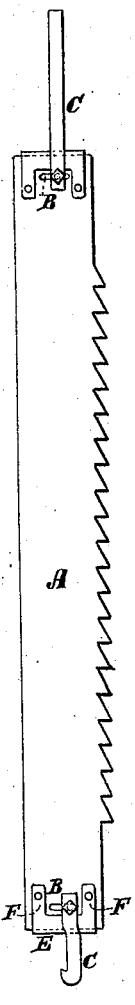
Figure 2:
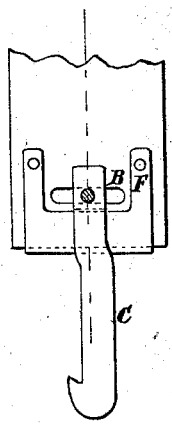
Figure 3:
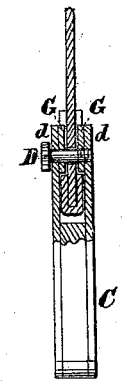

Figure 1 is a side elevation of a saw and the connecting devices, constructed and arranged according to my improvements. Fig. 2 is an enlarged view of one end of the saw and its fastening in side elevation, and Fig. 3 is a section of Fig. 2 on the line $x\ x$.

A represents the saw; B, the slotted holes for the attachment of the "straps," hooks, or other devices by which the saw is to be connected to the frame so that the saw may be shifted forward and back on the said connections to shift the strain or overhang. These bars or connecting devices C are attached to the saw by a bar, $d$, passing from the end on each side to the slot, and sufficiently beyond to secure them by a bolt, D, passing through them and the saw, and either screwing into one bar or passing entirely through, and having a nut on the end to screw the bars up tight to hold the saw by friction. The ends of the saw are reenforced, to compensate for the working of the saw by the holes, by a thin plate, E, doubled over the ends and extended at each end of the slots beyond them, as shown at F, and riveted to the saw. As the bars $d$ pass outside of these plates thin washers G are placed under the bars where the bolts go through to fill out flush with the surface of said plates F.

By this arrangement the saw may be very readily shifted as required, and fastened so as not to work loose, without the aid of the expensive set-screws and other contrivances commonly used.

Having thus described my invention, I claim as new and desire to secure by Letters Patent—

A saw having a transverse slot, B, at each end, combined with strap-bars held thereto by bolts passing through said slots, and allowing the saw to be shifted and clamped at different points, in the manner described.

ALFRED P. SPROUL.

Witnesses:
    A. M. NASH,
    J. H. NICKELS.